United States Patent
Thomas

(10) Patent No.: US 7,281,239 B2
(45) Date of Patent: Oct. 9, 2007

(54) METHOD FOR DETERMINING SOFTWARE LOAD PROCESS

(75) Inventor: Keith Thomas, Vermillion, SD (US)

(73) Assignee: Gateway Inc., Irvine, CA (US)

( * ) Notice: Subject to any disclaimer, the term of this patent is extended or adjusted under 35 U.S.C. 154(b) by 712 days.

(21) Appl. No.: 10/646,184

(22) Filed: Aug. 22, 2003

(65) Prior Publication Data

US 2005/0044543 A1 Feb. 24, 2005

(51) Int. Cl.
G06F 9/45 (2006.01)
(52) U.S. Cl. ...................................... 717/128
(58) Field of Classification Search ................. 717/128
See application file for complete search history.

(56) References Cited

U.S. PATENT DOCUMENTS

| | | | |
|---|---|---|---|
| 6,083,281 | A | 7/2000 | Diec et al. |
| 6,311,327 | B1 | 10/2001 | O'Brien et al. |
| 6,418,442 | B1 | 7/2002 | Dwyer, III |
| 6,442,684 | B1 | 8/2002 | Lee et al. |
| 2006/0143430 | A1* | 6/2006 | Morrison et al. ............ 713/1 |

* cited by examiner

*Primary Examiner*—John Chavis
(74) *Attorney, Agent, or Firm*—Jeffrey A. Proehl; Wood Fuller Shultz & Smith PC

(57) ABSTRACT

The present invention is a method for determining the software load process. In an exemplary aspect of the present invention, a method for determining computer system software load process may start with loading computer system software on a computer. Then a marker file may be provided in the loaded computer system software. The marker file may indicate whether the loaded computer system software was loaded in a computer manufacturer's factory, loaded by a system restoration CD (SRCD), or loaded by downloading an image. When a program running on the computer abnormally terminates and the computer is able to send the marker file to a central authority, the marker file may be sent to the central authority by the computer. When a program running on the computer abnormally terminates and the computer is not able to send the marker file to a central authority, the marker file may be sent to the central authority by the computer after the computer reboots. The present invention may be applied to determining a load process for any computer software, including any system software and any application software.

27 Claims, 2 Drawing Sheets

METHOD FOR DETERMINING SOFTWARE LOAD PROCESS

FIELD OF THE INVENTION

The present invention generally relates to digital computers, and particularly to a method for determining the software load process.

BACKGROUND OF THE INVENTION

Almost every computer user has experienced such a situation: s/he is working on something on the computer and suddenly the computer either stops responding ("freezes") or shows the "blue screen of death" ("crashes"). There are several indications that let a user know that a computer may be frozen. The most common is the "unresponsive" program. The program will simply not do what you tell it to do. Additionally, the program may appear "stuck" in the task bar at the bottom of the screen (it will appear to be eternally minimized, never being capable of being opened for use by a user). Alternatively, a user may see a message pop up, telling the user that a program has performed an "illegal operation" or "is no longer responding;" these are ways the computer operating system tells the user that the program has frozen. A major indication that a computer may be frozen is that the mouse "freezes" in its place, and cannot be moved about the screen any more. The "blue screen of death" is probably the most obvious indication: a computer will flash to a blue-background with white text, listing a small amount of computer code alongside an error message.

There are many reasons why a computer may freeze or completely crash, among which the system software load process may be a major reason. Those of ordinary skill in the art will understand that software is a generic term for organized collections of computer data and instructions. Software is often broken into two major categories: system software that provides the basic non-task-specific functions of the computer, and application software which is used by users to accomplish specific tasks.

The computer system software load process may be critical to understanding and resolving the issue why a computer freezes or crashes. Thus, it would be advantageous to provide a method to determine the different system software load process: whether the loaded computer system software was loaded in a computer manufacturer's factory, loaded by a system restoring CD (SRCD), or loaded by downloading an image. By communicating the system software load information back to a central authority when or after a computer crashes or freezes, the computer manufacturer may be able to use such information (e.g., by performing a statistical analysis of the data, and the like) to trace the cause of why the computer crashes or freezes and find a corresponding solution.

SUMMARY OF THE INVENTION

Accordingly, the present invention is directed to a method for determining the software load process. In an exemplary aspect of the present invention, a method for determining computer system software load process may start with loading computer system software on a computer. Then a marker file may be provided in the loaded computer system software. The marker file may indicate whether the loaded computer system software was loaded in a computer manufacturer's factory, loaded by a system restoration CD (SRCD), or loaded by downloading an image. When a program running on the computer abnormally terminates and the computer is able to send the marker file to a central authority, the marker file may be sent to the central authority by the computer. When a program running on the computer abnormally terminates and the computer is not able to send the marker file to a central authority, the marker file may be sent to the central authority by the computer after the computer reboots.

It is understood that the present invention may be applied to determining a load process for any computer software, including any system software and any application software.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
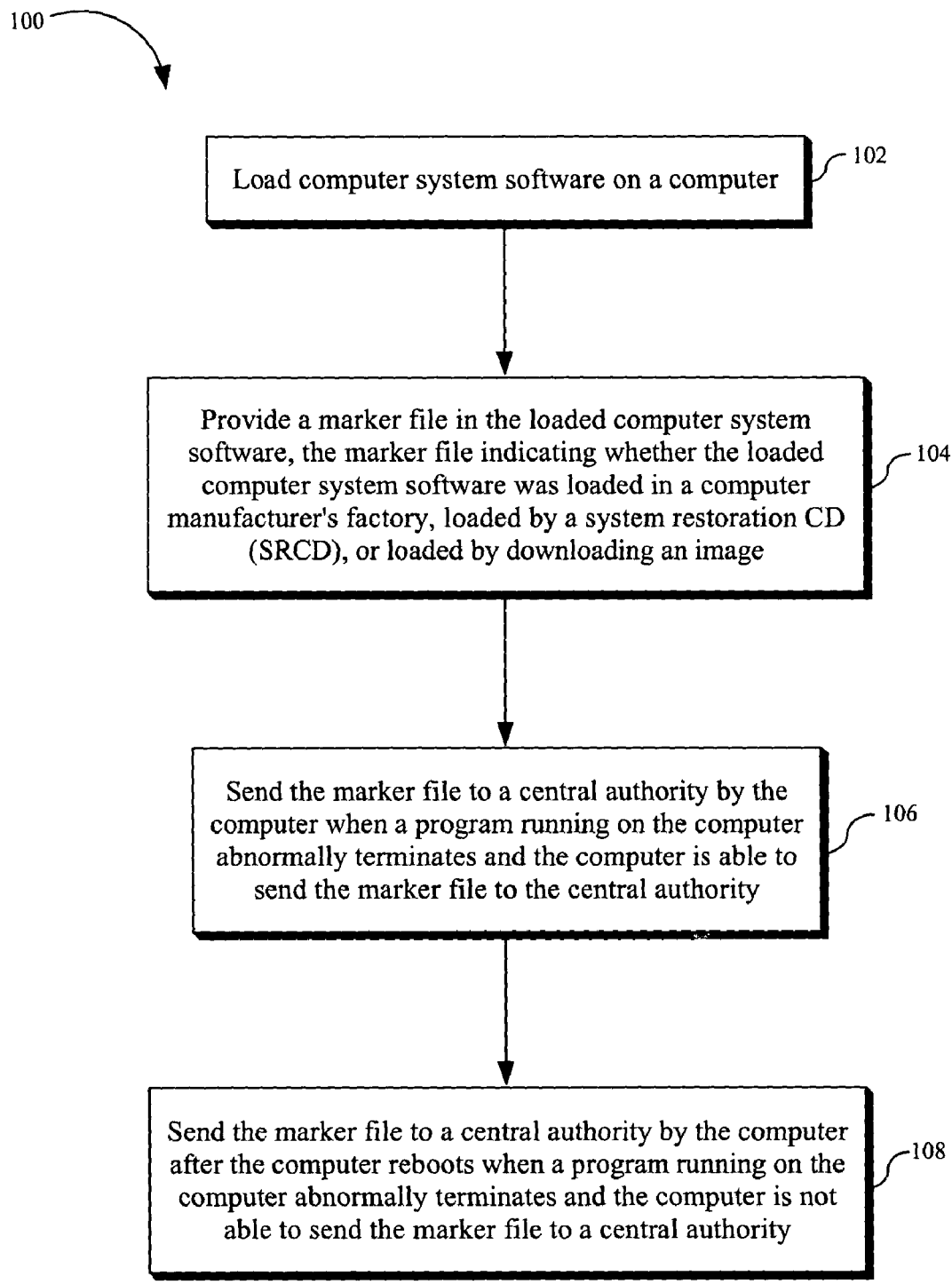
FIG. 1 shows an exemplary method for determining computer system software load process in accordance with an exemplary embodiment of the present invention.

Referring first to FIG. 1, an exemplary method 100 for determining computer system software load process in accordance with an exemplary embodiment of the present invention is shown. The method 100 may start with step 102, in which computer system software is loaded onto a computer 102. Those of ordinary skill in the art will understand that system software is a generic term referring to any computer program or library whose purpose is to help run the computer system, as opposed to application software that helps solve user problems directly. System software includes operating systems (e.g., a Windows operating system, LINUX, and the like), device drivers, compilers, assemblers, linkers, utilities, and the like.

Next, a marker file may be provided in the loaded computer system software, the marker file indicating whether the loaded computer system software was loaded in a computer manufacturer's factory, loaded by a system restoring CD (SRCD), or loaded by downloading an image (e.g., from the Internet, an intranet, the World Wide Web, and the like) 104. In a preferred embodiment, when the loaded computer system software is loaded by downloading an image, the marker file may be dynamically generated. In an additional embodiment, when the loaded computer system software is loaded by a SRCD, the marker file in the loaded computer system software may be a static marker file loaded from the SRCD. In another embodiment, when the loaded computer system software is loaded in a computer manufacturer's factory, the marker file may be either dynamically generated or may be a static marker file loaded by the factory. It is understood by those of ordinary skill in the art that the marker file may be generated in various embodiments without departing from the scope and spirit of the present invention. The image, the system software, the marker file, or components thereof, may be loaded by any of the manufacturer, the end user, or a maintenance representative. The manufacturer may be the original design manufacturer ("ODM"—also known as product supplier; e.g., a manufacturing concern under contract to the OEM such as Wistron), the third party installer, the original equipment manufacturer ("OEM"; e.g., Gateway), or the like.

Then, when a program running on the computer abnormally terminates (e.g., when the computer "freezes" or "crashes" or the like) and when the computer is able to send the marker file to a central authority, the marker file may be sent to the central authority by the computer 106. Next, when a program running on the computer abnormally terminates and when the computer is not able to send the marker file to a central authority, the marker file may be sent to the central authority by the computer after the computer reboots 108. A central authority may be a computer manufacturer, a computer system software developer, and the like.

Figure 2:
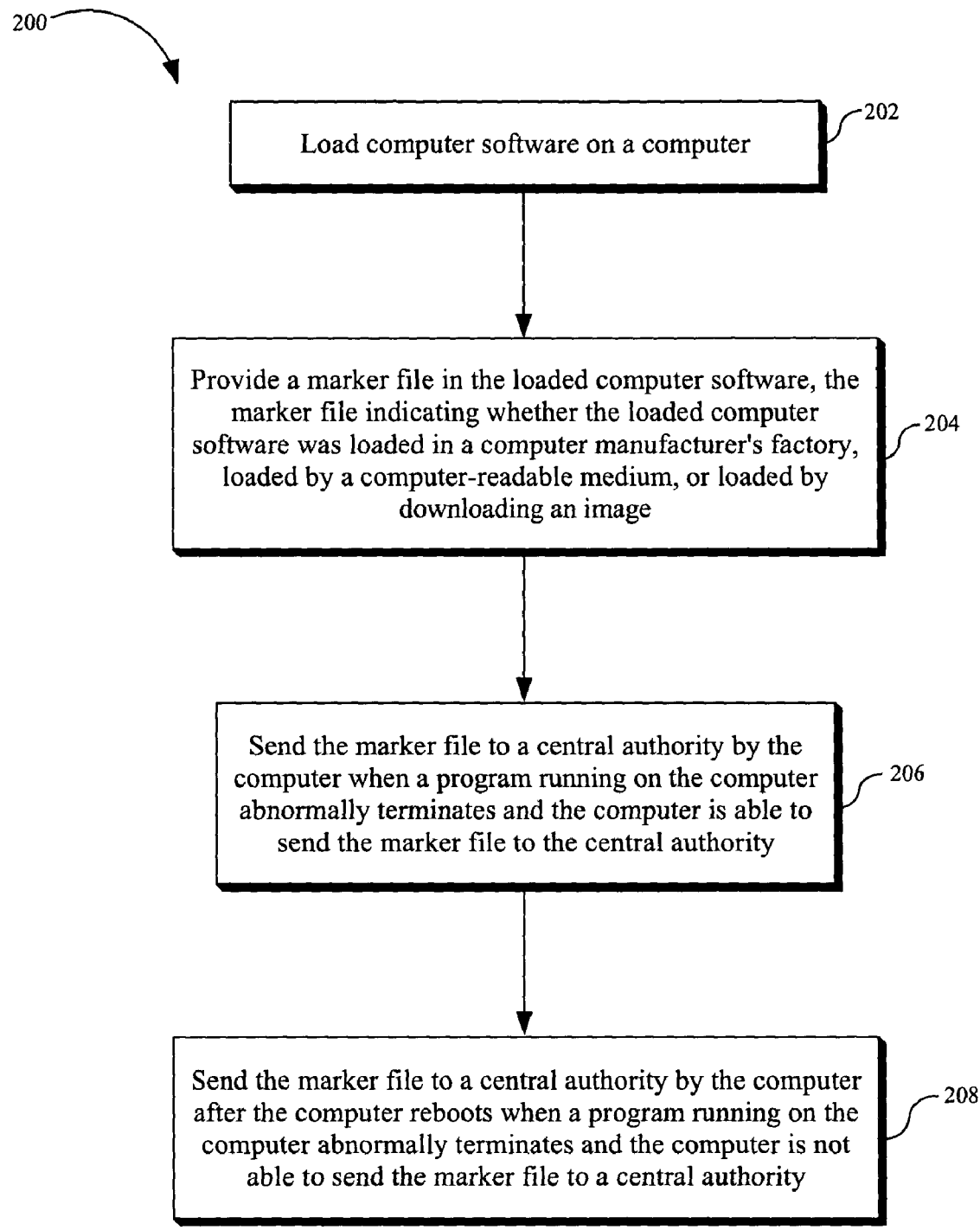
FIG. 2 shows an exemplary method for determining computer software load process in accordance with an exemplary embodiment of the present invention.

Referring to FIG. 2, an exemplary method 200 for determining computer software load process in accordance in accordance with an exemplary embodiment of the present invention is shown. The method 200 is similar to the method 100 shown in FIG. 1. However, the method 200 may be applied to determining a load process for any software, including system software and application software. The method 200 may start with a step 202, in which computer software is loaded onto a computer 202. A marker file may be provided in the loaded computer software, the marker file indicating whether the loaded computer software was loaded in a computer manufacturer's factory, loaded by a computer-readable medium (e.g., conventional floppy disks, optical disks, CD-ROMs, magneto-optical disks, or the like), or loaded by downloading an image (e.g., from the Internet, an intranet, the World Wide Web, and the like) 204. In a preferred embodiment, when the loaded computer software is loaded by downloading an image, the marker file may be dynamically generated. In an additional embodiment, when the loaded computer software is loaded by a SRCD, the marker file in the loaded computer software may be a static marker file loaded from the SRCD. In another embodiment, when the loaded computer software (e.g., MS Word, and the like) is loaded in a computer manufacturer's factory, the marker file may be either dynamically generated or may be a static marker file loaded by the factory. It is understood by those of ordinary skill in the art that the marker file may be generated in various embodiments without departing from the scope and spirit of the present invention.

Then, when a program running on the computer abnormally terminates (e.g., when the computer "freezes" or "crashes" or the like) and when the computer is able to send the marker file to a central authority, the marker file may be sent to the central authority by the computer 206. Next, when a program running on the computer abnormally terminates and when the computer is not able to send the marker file to a central authority, the marker file may be sent to the central authority by the computer after the computer reboots 208. A central authority may be a computer manufacturer, a computer system software developer, and the like.

The present invention may provide a method for determining the type of download that was on a computer system before it "freezes" or "crashes" and may provide error reporting data to a central authority in order to assist computer manufacturers in tracking computer issues. By communicating the system software load information back to a central authority when or after a computer crashes or freezes, the computer manufacturer may be able to use such information (e.g., by performing a statistical analysis of the data, and the like) to trace the cause of why the computer crashes or freezes and find a corresponding solution.

It is to be noted that the above described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for determining computer system software load process, comprising:
 loading computer system software on a computer; and
 providing a marker file in said loaded computer system software, said marker file indicating whether said loaded computer system software was loaded in a computer manufacturer's factory, loaded by a system restoration CD (SRCD), or loaded by downloading an image.

2. The method of claim 1, further comprising:
 when a program running on said computer abnormally terminates and said computer is able to send said marker file to a central authority, sending said marker file to said central authority by said computer.

3. The method of claim 2, wherein said marker file is used by said computer manufacturer to trace a cause of why said program running on said computer abnormally terminates.

4. The method of claim 1, further comprising:
 when a program running on said computer abnormally terminates and said computer is not able to send said marker file to a central authority, sending said marker file to said central authority by said computer after said computer reboots.

5. The method of claim 4, wherein said marker file is used by said computer manufacturer to trace a cause of why said program running on said computer abnormally terminates.

6. The method of claim 1, wherein said marker file is dynamically generated when said loaded computer r system software was loaded by downloading an image.

7. The method of claim 1, wherein said marker file is a static marker file loaded from said system restoration CD (SRCD) when said loaded computer system software was loaded by aid system restoration CD (SRCD).

8. The method of claim 1, wherein said marker file, when said loaded computer system software was loaded in a computer manufacturer's factory, is either dynamically generated or a static marker file loaded by said factory.

9. The method of claim 1, wherein said loaded computer system software is an operating system.

10. The method of claim 1, wherein said loaded computer system software is a device driver.

11. The method of claim 1, wherein said computer manufacturer is an OEM.

12. A computer-readable medium having computer-executable instructions for performing a method for determining computer system software load process, said method comprising:
   loading computer system software on a computer; and
   providing a marker file in said loaded computer system software, said marker file indicating whether said loaded computer system software was loaded in a computer manufacturer's factory, loaded by a system restoration CD (SRCD), or loaded by downloading an image.

13. The computer-readable medium of claim 12 wherein said method further comprising:
   when a program running on said computer abnormally terminates and said computer is able to send said marker file to a central authority, sending said marker file to said central authority by said computer.

14. The computer-readable medium of claim 13, wherein said marker file is used by said computer manufacturer to trace a cause of why said program running on said computer abnormally terminates.

15. The computer-readable medium of claim 12, wherein said method further comprising:
   when a program running on said computer abnormally terminates and said computer is not able to send said marker file to a central authority, sending said marker file to said central authority by said computer after said computer reboots.

16. The computer-readable medium of claim 15, wherein said marker file is used by said computer manufacturer to trace a cause of why said program running on said computer abnormally terminates.

17. The computer-readable medium of claim 12, wherein said marker file is dynamically generated when said loaded computer system software was loaded by downloading an image.

18. The computer-readable medium of claim 12, wherein said marker file is a static marker file loaded from said system restoration CD (SRCD) when said loaded computer system software was loaded by said system restoration CD (SRCD).

19. The computer-readable medium of claim 12, wherein said marker file, when said loaded computer system software was loaded in a computer manufacturer's factory, is either dynamically generated or a static marker file loaded by said factory.

20. The computer-readable medium of claim 12, wherein said loaded computer system software is an operating system.

21. The computer-readable medium of claim 12 wherein said loaded computer system software is a device driver.

22. The computer-readable medium of claim 12, wherein said computer manufacturer is an OEM.

23. A method for determining computer software load process, comprising:
   loading computer software on a computer; and
   providing a marker file in said loaded computer software, said marker file indicating whether said loaded computer software was loaded in a computer manufacturer's factory, loaded by a computer-readable medium, or loaded by downloading an image.

24. The method of claim 23, further comprising:
   when a program running on said computer abnormally terminates and said computer is able to send said marker file to a central authority, sending said marker file to said central authority by said computer.

25. The method of claim 23, further comprising:
   when a program running on said computer abnormally terminates and said computer is not able to send said marker file to a central authority, sending said marker file to said central authority by said computer after said computer reboots.

26. The method of claim 23, wherein said loaded computer software is application software.

27. The method of claim 23, wherein said computer manufacturer is an OEM.

* * * * *